July 5, 1932.   J. E. LOVELY   1,865,528
MACHINE TOOL
Filed Nov 13, 1929   4 Sheets-Sheet 1
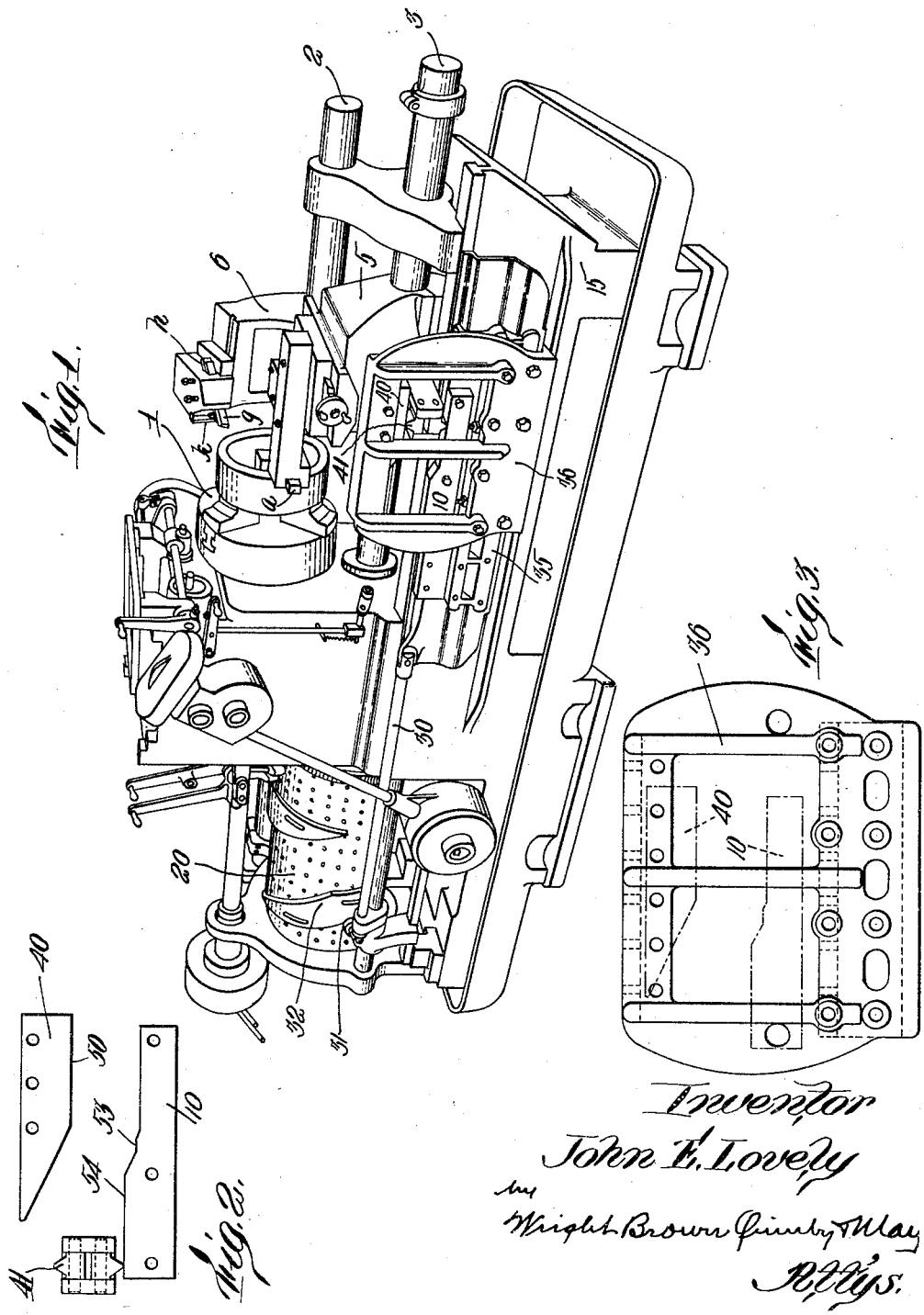
Inventor
John E. Lovely
by
Wright, Brown, Quinby & May
Attys.

July 5, 1932.  J. E. LOVELY  1,865,528
MACHINE TOOL
Filed Nov 13, 1929  4 Sheets-Sheet 2

Inventor:
John E. Lovely
by Wright, Brown, Quinby & May
Attys.

July 5, 1932.  J. E. LOVELY  1,865,528
MACHINE TOOL
Filed Nov 13, 1929   4 Sheets-Sheet 3

Inventor,
John E. Lovely
by Wright, Brown, Quinby & May
Attys.

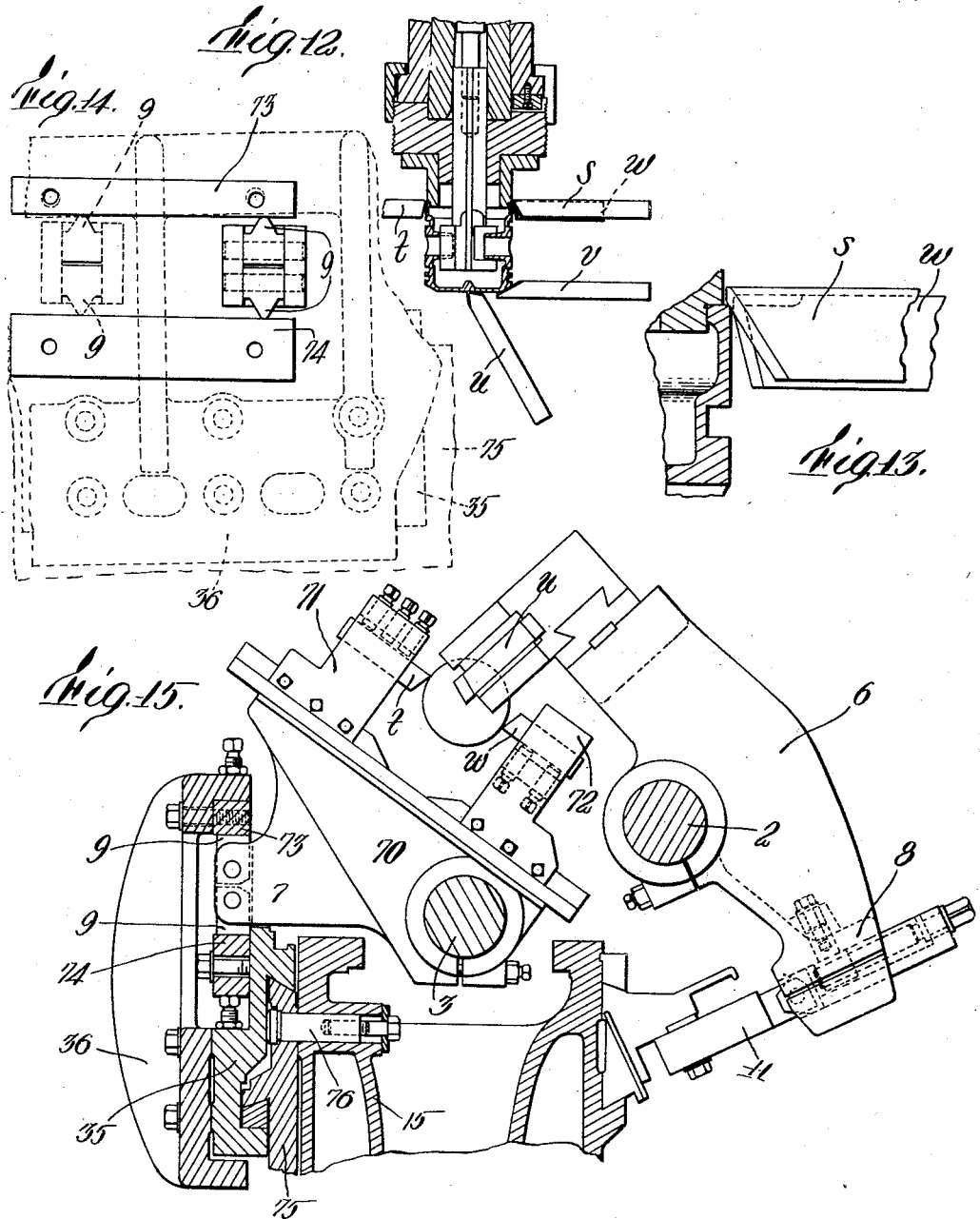

Patented July 5, 1932

1,865,528

UNITED STATES PATENT OFFICE

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT

MACHINE TOOL

Application filed November 13, 1929. Serial No. 406,798.

This invention relates to machine tools of that type in which tools are moved toward and from the work axis by former cams and more especially where the tools are carried on members pivoted on axes substantially parallel with that of the work, as by means of rockable tool shafts which may also have axial movement as in the well known Fay lathe.

The object of this invention is to provide tool controlling mechanism by which a greater number of operations may be performed with the same number of tool carriers and rock shafts than heretofore.

In a lathe of the Fay type it has been usual to have the tool carrier rest by gravity on the former cam and be fed toward the work axis positively by the cam. The retraction motion of the tool has been effected by gravity. According to the present invention, however, one or more of the tool carriers are so arranged that the retraction of the tool is made positive so that another tool or set of tools mounted on the same carrier may be rocked toward the work axis and positively controlled while the first mentioned tools are held out of operative position, one tool or set of tools thus being moved into operation as the other is being moved away from operative position. It will be seen that this permits a greater number of operations to be performed upon the work for the same number of tool carriers.

For a more complete understanding of this invention, reference may be had to the accompanying drawings in which Figure 1 is a perspective of a Fay lathe showing one embodiment of this invention.

Figure 2 is a diagrammatic side elevation showing the relationship between a pair of former cams and the cam follower device.

Figure 3 is a side elevation of the former cam connecting member showing positions of the cams relative thereto.

Figure 12 is a diagrammatic horizontal section through the work and holder with still a different type of work showing certain relations of the tools thereto.

Figure 13 is a view similar to a portion of Figure 12 but to a larger scale.

Figures 14 and 15 are views similar to Figures 9 and 10 but showing modifications for performing the operations illustrated in Figure 12.

Figure 4:
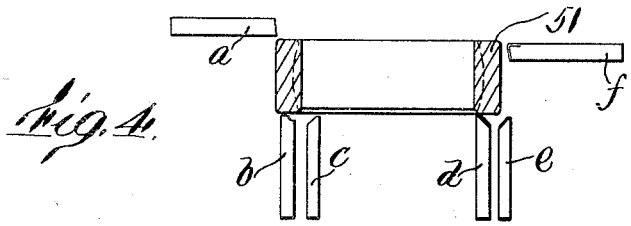
Figures 4 and 5 are diagrammatic views showing several tool positions for one kind of work, these tools being carried by the front and rear tool carriers, respectively.
Figure 5:
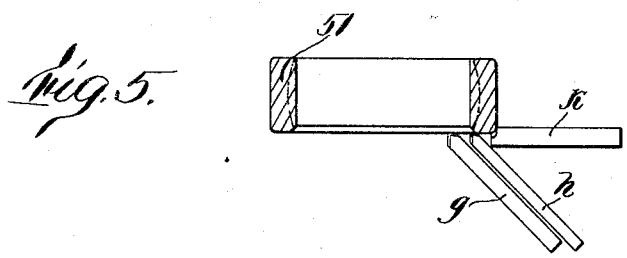

In Figure 1 is illustrated a lathe of the well known Fay type to which the subject matter of this invention is particularly applicable. A rotary work holder is shown at 1 in this figure and a pair of rockable and axially movable tool shafts or bars 2 and 3. The lower shaft 3 is shown as supporting a tool carrier 5 and the rear shaft 2 supports a tool carrier 6.

As is usual with lathes of this type each tool carrier has an extension, that for tool carrier 5 being shown at 7 and that for tool carrier 6 being shown at 8, which is designed to be provided with a suitable cam follower as 9 which rests by gravity on the upper edge of a former cam as 10 and 11. These former cams are mounted for rectilinear sliding movement on the front and rear faces of the machine bed 15 and the cams are so formed and controlled axially as to give the desired rocking motions of the tool carriers to present the tools thereon into operative relation to the work and to perform the desired operations thereon, the tools being moved out of operative positions, when permitted to do so by the engagement between the followers and the former cams, by gravity. The axial positions of the tool shafts 2 and 3 and of the former cams are, controlled by suitable independently adjustable cams carried by a cam drum 20, which is driven through suitable connections with the mechanism for rotating the work holder. Commonly also these drum are provided with controller cams for changing the speed of movement of the drums and of the tool shafts from slow to fast, or vice versa, in accordance with any desired predetermined sequence. The machine so far described is the ordinary well known Fay lathe.

Figure 6:
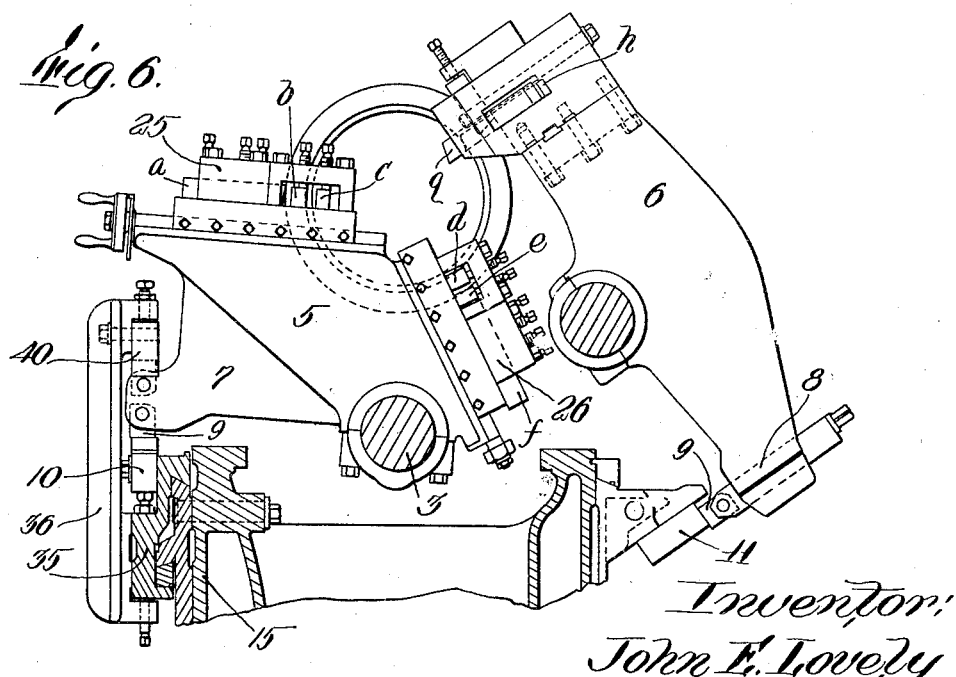
Figure 6 is a vertical section through the upper portion of the machine showing the tool carriers for tools performing the operations of Figures 4 and 5.
Figure 7:
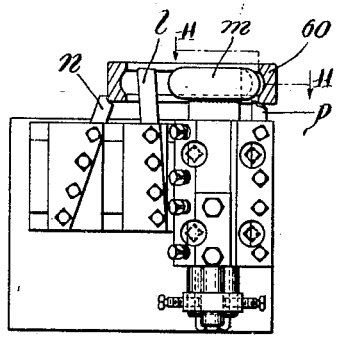
Figures 7 and 8 are diagrammatic views showing the operations effected by tools on the tool carriers shown in Figure 10 upon a different type of work from that shown in Figures 4, 5, and 6.
Figure 8:
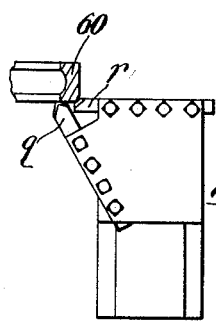
Figure 9:
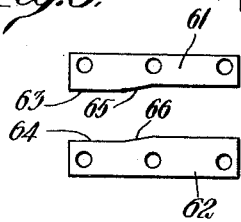
Figure 9 is a diagrammatic view of the former cams for the front tool carrier for the operations illustrated in Figure 7.
Figures 10, 11:
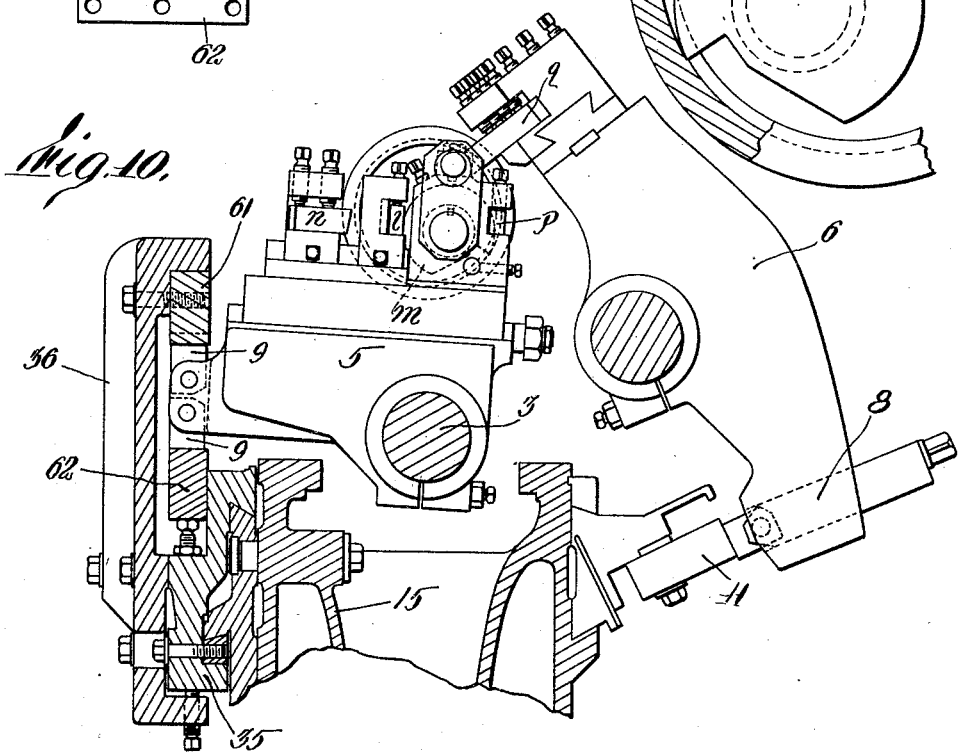
Figure 10 is a view similar to Figure 6, but showing the carriers and tools for performing the operations of Figures 7 and 8.
Figure 11 is an end elevation of a raceway-forming tool also illustrated in Figure 7.

In accordance with the present invention means are provided by which any desired tool carrier may be positively rocked in both directions so as to permit the use of a pair of tools or sets of tools, one of which is moved positively against the work and controlled by the usual former cam, and the other of which is moved positively against the work and its position controlled while the first mentioned tool or set of tools is out of operative position, as when its former cam permits the tool carrier to be moved by gravity out of operative position therefor. Thus, as shown in Figure 6, the tool carrier 5 has one group of tools at 25 comprising tools a, b, c which are positioned on one side of the work axis and a second group of tools at 26 comprising tools d, e, f on the other side of the work axis. The group of tools at 25 is positively moved toward the work axis as the extension 7 of the work carrier is moved upwardly by its engagement with the former cam 10 and is permitted to move away from the work axis as this extension 7 is permitted to move downwardly. As, however, it is necessary that the feed of tools against the work be positive, means are provided for effecting a positive movement of the tool carrier to bring its extension 7 downwardly instead of providing for this movement by gravity only. The lower former cam carrying slide 35 is shown as provided with the usual rod 30 which carries the cam follower 31 controlled by the cam 32 on the cam drum 20. To this slide 35 is shown fixed a member 36 which extends upwardly and is provided at its upper inner end with any suitable means for fixing thereto an upper former cam 40, the lower face of which is cut to cam form and engages an upwardly directed follower 41 on the tool carrier extension 7. Thus the engagement of this follower 41 with the upper former cam 40 acts to rock the tool carrier positively in the opposite direction to the action of the lower former cam 10 on its cam follower 9.

With the tool arrangement and cams shown in Figures 1 to 6, a set of operations which may be performed may be seen from an inspection of Figures 2 and 4. As the bar 3 is moved axially toward the rear of the machine and the tool carrier extension 7 rides beneath the face 50 of the upper former cam (see Figure 2), the tool f effects a roughing cut on the outside of the work 51 which is shown as a ring member. When it nearly reaches the end of its roughing cut, the tools e and c come into action against the outer and inner edges of the ring, thus to chamfer these edges with a roughing cut. As the portion 53 of the lower former cam is reached the tool carrier is rocked in a direction to relieve the tools c, e and f and to bring the finishing tools b and d into position to finish the chamfers on the edges of the work. As the portion 54 of the lower former cam is reached the finishing cutter a is brought into position to finish cut on the return traverse of the shaft 3, the finishing tools b and d having been moved axially out of the way as this return traverse commences and before the finishing tool a has been brought into cutting position, by the cam face 54.

As shown in these figures the rear tool carrier 6 is not controlled positively in both directions and as shown this carrier has the roughing and finishing facing tools g, h and the chambering tool k, which comes into action after the facing tools g and h have faced the end of the work.

In Figures 7 to 10 is shown an embodiment of this invention by which a different set of operations may be performed. The work therein shown is the outer raceway 60 of a ball bearing. Upper and lower former cams 61 and 62 are employed, the upper former cam 61 being fixed to the member 36 as previously described and the lower former cam 62 being fixed to the cam slide 35. A somewhat different form of tool carrier fixed to the lower tool shaft 3 is shown, this tool carrier supporting a boring tool l which cuts a straight internal bore of the ring 60 while the angular position of the tool carrier is positively determined by engagement of its followers with the portions 63 and 64 of the upper and lower former cams 61 and 62, respectively. The cam drum on the machine is then thrown into fast motion according to the usual practice in the Fay lathe, pulling the former slide 35 rearwardly and bringing the followers into contact with the inclined portions 65 and 66 of the former cams, respectively. This relieves the cutting portion of the boring tool l from engagement with the work and brings the circular forming tool m, shown detached in Figure 11, into operative position against the inner face of the work which has been bored straight by the tool l. This motion also brings the chamfering tools n and p into position to finish chamfer the inner and outer edges of the raceway, the facing and roughing chamfer of the outside having been previously effected by tools $q$ and $r$, respectively, carried by the rear tool carrier 6.

In Figures 12 to 15 another set of operations which are performed on pistons is illustrated. In Figure 15 it will be seen that the tool carrier 70 is carried by the shaft 3, this tool carrier having a pair of tool posts 71 and 72 thereon. One of these, as 72, carries a tool $s$ for effecting a roughing longitudinal cut on the outside of the piston and the tool post 71 carries a tool $t$ for effecting a sizing cut on the same surface. The tool $s$ is mounted slightly forwardly of the tool $t$ in the desired direction of traverse and during this longitudinal cut the extension of the tool carrier 70 rides with its followers 9 in contact with the upper and lower former cams 73 and 74, which are arranged in parallel relation with each other and parallel with the axis of the work, and positively hold both tools $s$ and $t$ in their desired position. The cam slide 35 (Figure 15) is mounted on the guide 75. Guide 75 is mounted on bed 15 on pivot stud 76 and is clamped to bed 15 by a series of screws not shown. Guide 75 is clamped to the bed 15 so that the right hand end of the guide, as viewed from the position shown in Figure 1, is higher than the left hand end of the guide. Cam slide 35 may be moved along guide 75 by means of rod 30 and special cams which engage roll 31, these special cams being mounted on drum 20. During the cutting traverse of the tools $s$ and $t$ cam slide 35 is held in its right hand extreme position, looking at the machine from the position in Fig. 1. During this cutting traverse of tools $s$ and $t$, the cam followers 9 slide along the engaging surfaces on cams 73 and 74. At the end of the cutting traverse of tools $s$ and $t$ the cam slide 35 is moved to the left, as viewed from position Figure 1. Moving the cam slide 35 to the left in this manner lowers cam 73 and 74, thus rocking the tool carrier 70 slightly to bring the sizing tool $t$ away from the work but insufficient to move the tool $s$ into engagement with the sized surface. The tools being thus relieved from the work, cam slide 35 is held in its left hand position by a suitable cam (not shown) on drum 20, while tools $s$ and $t$ are given their return idle traverse. The rear tool carrier 6 is shown as carrying a facing tool $u$, and a top chamfering tool $v$, and a bottom chamfering tool $w$.

From the foregoing description of certain embodiments of this invention, it should be evident that the invention may be embodied in a great variety of constructions and for the accomplishment of many different tooling operations, those illustrated being given merely by way of example and not by way of restriction.

I I claim:

1. In combination, a work holder, a pivoted tool carrier having a pair of sets of tools either movable into operative position to work held by said work holder while the other is moved out of said position by rocking of said tool carrier, a former cam for supporting said tool carrier by gravity and movable relative thereto to determine the operative position of one of said sets of tools, and means for positively determining the operative positions of the tool of said other set when said tool carrier is permitted to rock away from the operative position for the tools of said one set.

2. In combination, a work holder, a tool carrier, a rockable and axially movable shaft for supporting said tool carrier, means for controlling the axial position of said carrier, two sets of tools carried by said carrier in position to present in accordance with the angular position of said carrier either set in operative relation to work held by said work holder while the other set is out of operative position, a member movable relative to said tool carrier axially of said shaft, and cam elements fixed to said member and cooperating with said tool carrier for positively controlling the angular positions thereof while the tools of either set are in operative relation to the work.

3. In combination, a work holder, a rockable and axially movable shaft arranged parallel to the axis of said work holder, a tool carrier fixed to said shaft, a cam movable parallel to said shaft and having a cam face, a follower on said carrier resting by gravity on said cam face, a tool on said carrier in position to be positively moved toward work on said holder by said cam and follower, a second tool on said carrier positioned to be moved by rocking of said carrier away from the work as said first tool is moved toward the work, and toward the work as said first tool is moved away from the work, and means for positively moving said carrier to move said second tool toward the work.

4. In combination, a rotary work holder, a rockable and axially movable shaft parallel with the axis of said work holder, a tool carrier fixed to said shaft, a former cam on which said tool carrier rests by gravity, a tool on said carrier movable positively toward work held by said holder by said former cam, a second tool on said carrier movable away from the work by rocking of said carrier in a direction to move said first mentioned tool toward the work and movable toward the work as said first mentioned tool is moved by gravity movement of said carrier away from the work, a second former cam with which said carrier cooperates to effect positive movement of said second tool toward the work, means for fixing said former cams together, and means for relatively moving said shaft and former cams axially of the work.

5. In combination, a rotary work holder, a rockable and axially movable shaft positioned beneath said work holder, a tool carrier fixed to said shaft and having a portion extending laterally of said shaft, a former cam mounted to slide substantially parallel to the axis of said shaft and on which said laterally extending portion rides by gravity, a tool on said carrier positioned to be moved toward work on said holder positively by said former cam, a second tool on said carrier positioned to be moved away from the work by said former cam, a second former cam on the under side of which said laterally extended portion rides for positively moving said second tool toward the work as said first mentioned tool moves away from the work, rigid connections between said former cams, a cam drum, and cams on said drum for controlling the axial positions and movements of said shaft and former cams.

6. In combination, a work holder, a tool carrier mounted to rock about an axis parallel to that of said work holder and for bodily movement in the direction of said axis, a lower former cam on which a portion of said carrier rests by gravity, a member fixed to said former cam and extending upwardly therefrom, an upper former cam fixed to said member in position to be engaged from below by said carrier portion, said former cams controlling the angular position of said carrier, tools carried by said carrier for operation on work held by said holder, and independently adjustable means for moving said shaft axially and said former cams substantially parallel thereto.

In testimony whereof I have affixed my signature.

JOHN E. LOVELY.